United States Patent
Chen et al.

(10) Patent No.: US 7,671,498 B2
(45) Date of Patent: Mar. 2, 2010

(54) FAN MOTOR AND STATOR THEREOF

(75) Inventors: Lee-Lung Chen, Taoyuan Hsien (TW);
Shih-Wei Huang, Taoyuan Hsien (TW);
Shih-Ming Huang, Taoyuan Hsien (TW);
Wen-Shi Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 0 days.

(21) Appl. No.: 11/418,291

(22) Filed: May 5, 2006

(65) Prior Publication Data

US 2006/0255668 A1 Nov. 16, 2006

(30) Foreign Application Priority Data

May 13, 2005 (TW) .............................. 94115574 A

(51) Int. Cl.
*H02K 5/16* (2006.01)
(52) U.S. Cl. ....................................................... 310/90
(58) Field of Classification Search .................... 310/90
See application file for complete search history.

(56) References Cited

U.S. PATENT DOCUMENTS

| | | | |
|---|---|---|---|
| 5,121,017 A * | 6/1992 | Yamamoto et al. ......... | 310/49 R |
| 5,610,462 A * | 3/1997 | Takahashi ..................... | 310/90 |
| 6,050,786 A | 4/2000 | Lin | |
| 6,107,717 A * | 8/2000 | Lin et al. ....................... | 310/90 |
| 6,137,197 A * | 10/2000 | Taniguchi et al. ......... | 310/67 R |
| 6,193,478 B1 | 2/2001 | Lin et al. | |
| 6,320,291 B1 * | 11/2001 | Lin et al. ....................... | 310/91 |
| 6,346,759 B1 * | 2/2002 | Suzuki et al. ................ | 310/254 |
| 6,411,509 B1 | 6/2002 | Chuang et al. | |
| 6,414,409 B1 * | 7/2002 | Masuda ......................... | 310/90 |
| 6,414,411 B1 * | 7/2002 | Horng et al. .................. | 310/194 |
| 6,420,805 B1 * | 7/2002 | Yamaguchi et al. ......... | 310/67 R |
| 6,448,675 B1 * | 9/2002 | Horng et al. .............. | 310/67 R |
| 6,462,443 B2 * | 10/2002 | Horng ......................... | 310/68 B |
| 6,530,746 B2 | 3/2003 | Huang et al. | |
| 6,573,633 B2 | 6/2003 | Horng et al. | |
| 6,648,590 B2 | 11/2003 | Huang et al. | |
| 6,652,246 B1 | 11/2003 | Lin et al. | |
| 6,710,504 B2 * | 3/2004 | Ohiwa et al. ................. | 310/257 |
| 7,015,603 B2 * | 3/2006 | Barrho et al. .............. | 310/49 R |
| 2005/0093383 A1 * | 5/2005 | Wu et al. ................... | 310/67 R |

FOREIGN PATENT DOCUMENTS

| | | |
|---|---|---|
| CN | 2328125 Y | 7/1999 |
| GB | 2370697 A * | 7/2002 |

(Continued)

*Primary Examiner*—Nguyen N Hanh
(74) *Attorney, Agent, or Firm*—Birch, Stewart, Kolasch & Birch, LLP

(57) ABSTRACT

A fan comprises a stator base, a rotor, at least one blade, an upper magnetic pole plate, a lower magnetic pole plate, a coil and a sidewall. The stator base comprises a stator base having a seat and a tubular portion protruding from the seat and having an axial hole. The seat and the tubular portion are formed as a monolithic piece to be a magnetic conductor. The rotor enclosing the tubular portion comprises a shaft disposed in the axial hole. The blades are circumferentially disposed at a periphery of the rotor. The upper magnetic pole plate is disposed near a top of the tubular portion and the lower magnetic pole plate is disposed near a bottom of the tubular portion. The coil is disposed between the upper and lower magnetic pole plates. The sidewall is circumferentially disposed at a periphery of the stator base.

20 Claims, 4 Drawing Sheets

FOREIGN PATENT DOCUMENTS

| | | |
|---|---|---|
| TW | 434980 | 5/2001 |
| TW | 506655 | 11/2002 |
| TW | 517429 | 1/2003 |
| TW | 539346 | 6/2003 |

* cited by examiner

FAN MOTOR AND STATOR THEREOF

BACKGROUND OF THE INVENTION

1. Field of the Invention

The invention relates to a fan, a motor and a stator structure thereof, and in particular to an integrally formed stator base, supporting for a fan, a motor and a stator structure thereof.

2. Description of the Prior Art

In current electronic device, fans are provided as heat dissipation devices to exhaust heat. For example, a base plate and a stator sleeve is formed by different materials, and a stator base can be formed by embedding the stator sleeve in a central hole of the base plate, such as those described in Taiwan Patent Nos. 506655, 539346, 517429 and 434980, U.S. Pat. Nos. 6,530,746, 6,648,590, 6,411,509, 6,652,246, 6,050,786 and 6,193,478.

With the rapid development of small-sized electronic devices, a fan and a space for receiving the fan must be minimized to decrease the total volume of the electronic devices. When the volume of the fan is minimized, contact area between the stator sleeve and the base plate is decreased, correspondingly decreasing a bonding force between the stator sleeve and the base plate and causing disengagement, dislocation, damage during fan rotation.

SUMMARY OF THE INVENTION

The invention provides a fan or motor to increase efficiency of magnetic conduction of a magnetic pole assembly.

The invention provides a fan or motor to increase concentricity, perpendicularity and structural integrity of a stator base.

The invention provides a fan or motor to decrease volume in the axial and radial directions thereof.

The invention provides a fan or motor to increase attraction between the rotor and stator and prevent the rotator to be thrown away while rotation.

A fan of the invention comprises a stator base, a rotor, at least one blade, at least one upper magnetic pole plate, at least one lower magnetic pole plate, at least one coil and a sidewall. The stator base comprises a stator base having a seat and a tubular portion protruding from the seat and having an axial hole. The seat and the tubular portion are formed as a monolithic piece to be a magnetic conductor. The rotor enclosing the tubular portion comprises a shaft disposed in the axial hole. The blades are circumferentially disposed at a periphery of the rotor. The upper magnetic pole plate is disposed near a top of the tubular portion and the lower magnetic pole plate is disposed near a bottom of the tubular portion. The coil is disposed between the upper magnetic pole plate and the lower magnetic pole plate. The sidewall is circumferentially disposed at a periphery of the stator base.

A motor of the invention comprises a stator base, a rotor, at least one upper magnetic pole plate, at least one lower magnetic pole plate and at least one coil. The stator base comprises a seat and a tubular portion protruding from the seat and having an axial hole. The seat and the tubular portion are formed as a monolithic piece to be a magnetic conductor. The rotor enclosing the tubular portion comprises a shaft disposed in the axial hole. The upper magnetic pole plate is disposed near a top of the tubular portion. The lower magnetic pole plate is disposed near a bottom of the tubular portion. The coil is disposed between the upper magnetic pole plate and the lower magnetic pole plate.

A stator structure of the invention comprises a seat and a tubular portion. The tubular portion protruding from the seat has an axial hole. The seat and the tubular portion are formed as a monolithic piece to be a magnetic conductor.

A fan of the invention comprises a stator base, a rotor, at least one blade and a magnetic pole assembly. The stator base comprises a seat and a tubular portion. The tubular portion protruding from the seat has an axial hole. The seat and the tubular portion are formed as a monolithic piece to be a magnetic conductor. The rotor enclosing the tubular portion comprises a shaft disposed in the axial hole. The blade is circumferentially disposed at a periphery of the rotor. The magnetic pole assembly is mounted on the outside of the tubular portion by socketing.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE PREFERRED EMBODIMENTS

Figure 1:
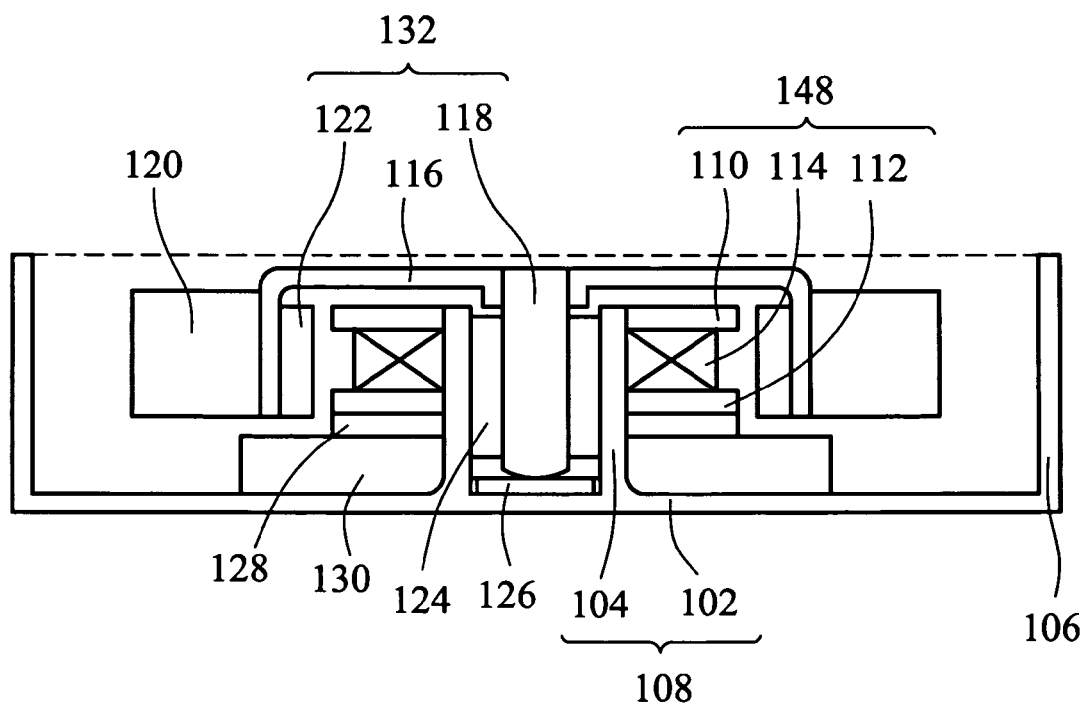
FIG. 1 is a schematic section view of a fan of the first embodiment of the invention.
Figure 2:
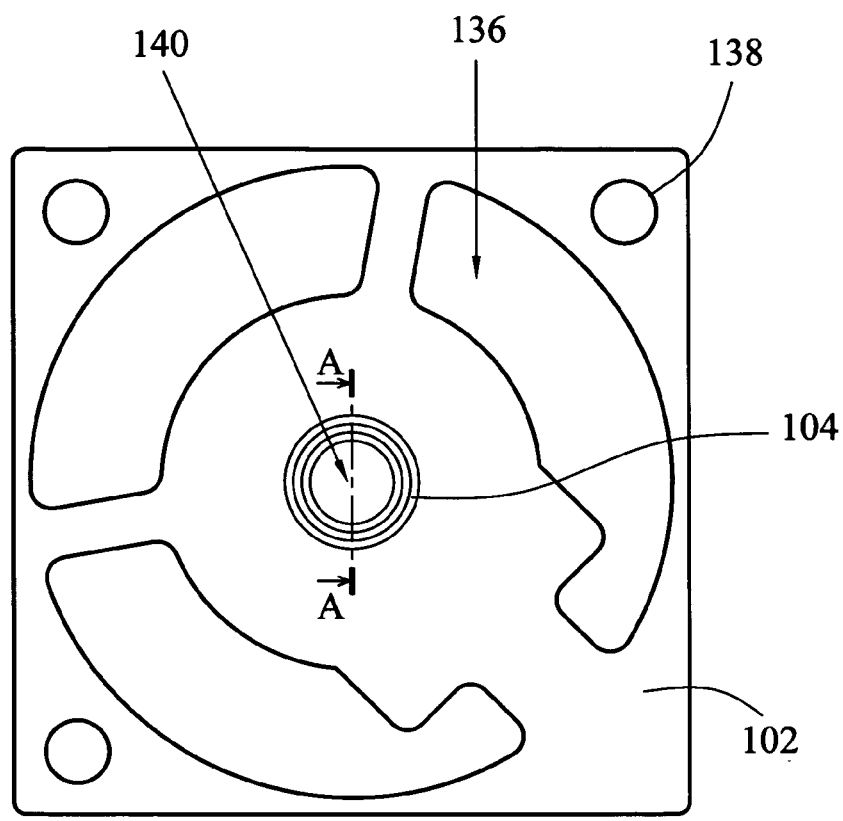
FIG. 2 is a top view of a stator base of a preferred embodiment of the invention.
Figure 3:
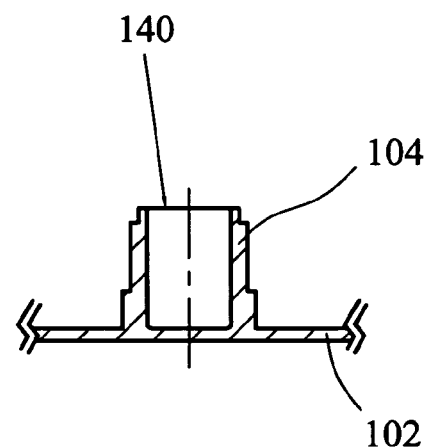
FIG. 3 is a section view of the stator base along line (A-A) of FIG. 2.

In FIGS. 1, 2 and 3, a fan 100 of the first embodiment comprises a motor and at least one blade 120 circumferentially disposed at a periphery of the motor. The fan 100 can be an axial fan, a side-blown fan or a lean-flow fan.

The motor comprises a stator structure and a rotor 132, and the stator structure having a stator base 108 and a stator magnetic pole assembly 148. The stator base 108 comprises a seat 102 and a tubular portion 104 formed as a monolithic piece with the seat 102. The surface of the seat 102 comprises at least one vent 136, and the vent 136 penetrates the seat 102 to guide airflow for the fan 100. The shape and dimensions of the vent 136 can vary depending on requirements. The seat 102 comprises at least one connecting portion 138 for connecting to an external system (not shown in Figs.). In the preferred embodiments, the connecting portion 138 can be a hole, a docking structure, a connecting structure or a fastening structure, the seat 102 can be a flat plate, and the stator base 108 is made of permeable magnetic material or conductive magnetic material.

An axial hole 140 is disposed in the tubular portion 104 protruded form the surface of the seat 102, and the axial hole 140 penetrates the seat 102 or not. The sectional profile of the tubular portion 104 or the axial hole 140 can be a polygonal, circular or elliptical shape. The outside of the tubular portion 104 can be a ladder-shaped or shoulder-shaped shown as FIG. 3.

The magnetic pole assembly 148 disposed outside of the tubular portion 104 comprises an upper magnetic pole plate 110, a lower magnetic pole plate 112 corresponding to the upper magnetic pole plate 110, and a coil 114 disposed between the upper magnetic pole plate 110 and the lower magnetic pole plate 112. Both the upper magnetic pole plate 110 and the lower magnetic pole plate 112 have a plurality of magnetic pole portions. The magnetic pole portions of the upper magnetic pole plate 110 and the magnetic pole portions of the lower magnetic pole plate 112, disposed near a top and a bottom of the tubular portion 104 by socketing or embedding, are alternately arranged. In this embodiment, the coil 114 is axially formed by axially winding, adhesion or socketing. The coil 114 can be an axially wired coil.

Figure 6:
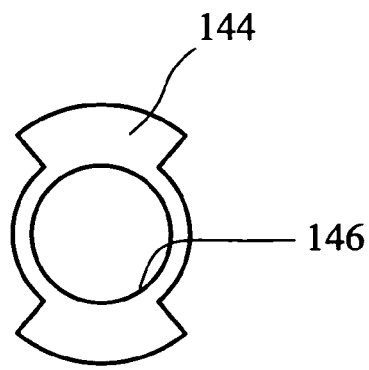
FIG. 6 is a schematic view of a magnetic pole plate of a preferred embodiment of the invention.

In FIG. 6, the upper magnetic pole plate 110 comprises a magnetic pole portion 144 having a magnetic pole number and a socket hole 146 corresponding to the tubular portion 104. The magnetic pole number of the pole tooth portion 144 is a positive integer. The upper magnetic pole plate 110 or the lower magnetic pole plate 112 can be coated with an insulating material.

The stator base 108 further comprises a sidewall 106 circumferentially disposed at a periphery of the seat 102. The sidewall 106 and the seat 102 are coupled or integrally formed as a single piece. In the preferred embodiment, the sidewall can be a plate, a arc-plate or a tubular structure.

The rotor 132 enclosing the tubular portion 104 comprises a hub 116, a shaft 118 and a magnetic pole part 122. The hub 116 has a recess to enclose the magnetic pole assembly 148. Preferably, the hub 116 is made of plastics, metal or rigid material and can be a single layer structure or a multilayer structure formed by same or different materials. The shaft 118 has two ends, which one end is disposed in the axial hole 140 and another end is connected to the hub 116. The shaft 118 is preferably made of metal, rigid material or permeable magnetic material. The magnetic pole number of the magnetic pole part 122 is similar to the sum of the magnetic pole number of the upper magnetic pole plate 110 and the lower magnetic pole plate 112. The magnetic pole part 122 can be made of rubber or flexible magnet, permanent magnet or other magnetizing apparatuses. An attraction is formed between the magnetic pole part 122 and the seat 102.

The blades 120 are disposed at the periphery of the hub 116 of the rotor 132. In this embodiment, the blade 120 has a curved or plate shape.

The motor further comprises a bearing 124 disposed between the axial hole 140 and the shaft 118, and the bearing 124 can smoothly support the shaft 118 therein. In this embodiment, the bearing 124 can be a self-lubricating, roller, hydrodynamic or magnetic bearing. A wear pad 126 can be disposed between an end of the shaft 118 and a bottom of the tubular portion 104, and the wear pad 126 can reduce abrasion therebetween and increase life of the bearing 124.

The motor further comprises a circuit board 130 disposed on the seat 102, and the circuit board 130 is used to drive the motor. The motor further comprises an insulating structure 128 disposed between the circuit board 130 and the lower magnetic pole plate 112, and the insulating structure 128 can prevent the circuit board 130 from contacting the lower magnetic pole plate 112.

Figure 4:
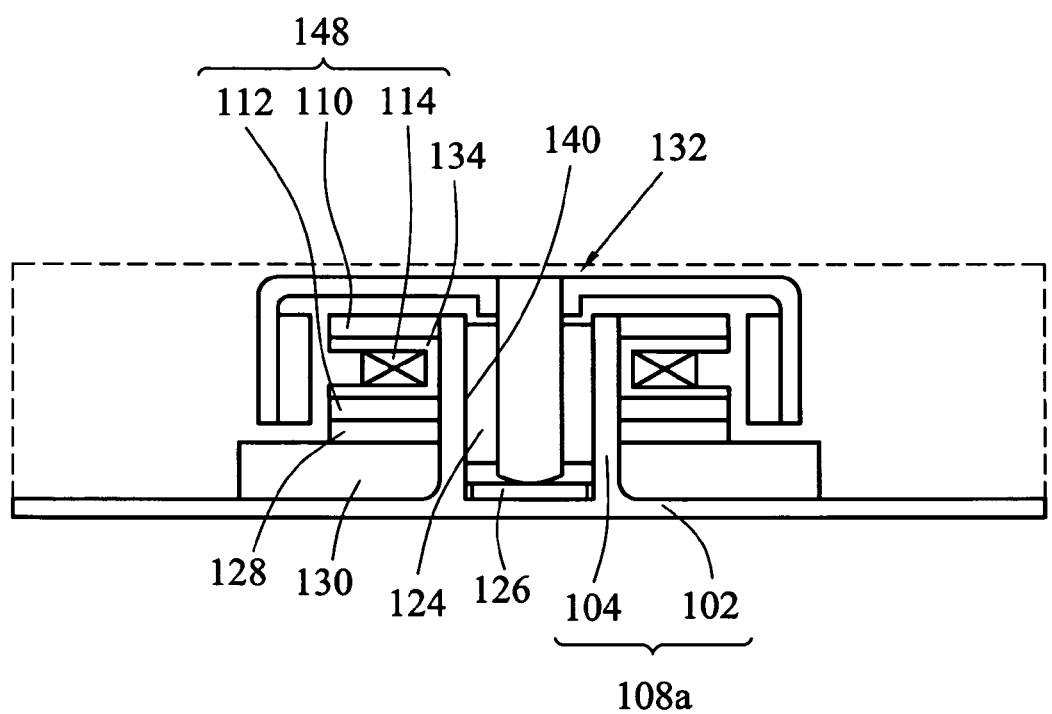
FIG. 4 is a schematic section view of a motor of the second embodiment of the invention.
Figure 5:
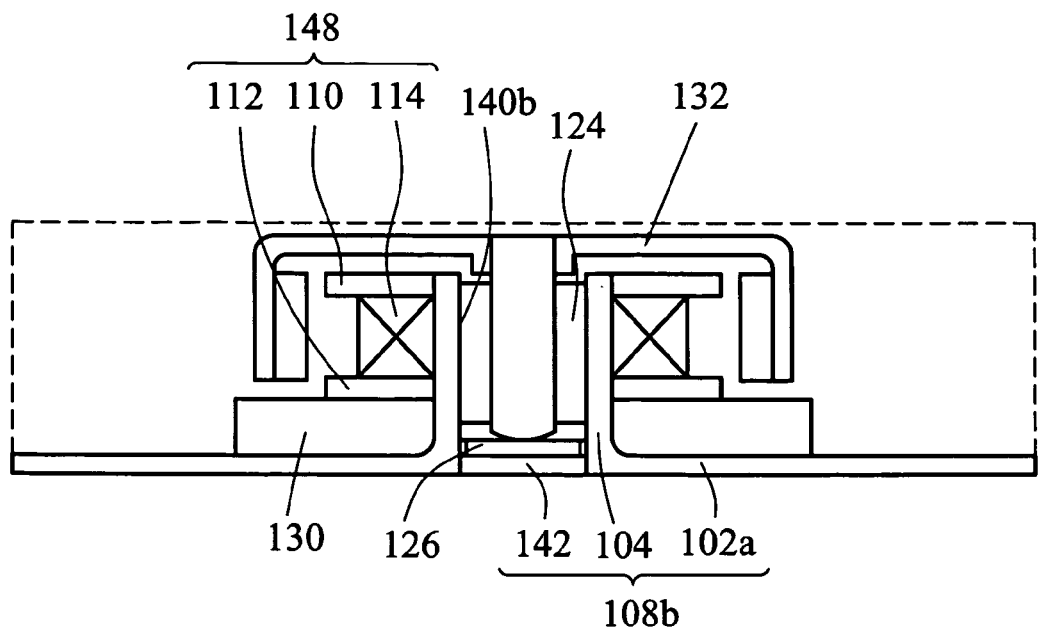
FIG. 5 is a schematic section view of a motor of the third embodiment of the invention.

FIGS. 4 and 5 are two motors 150a and 150b of the second and third embodiments of the invention, respectively. In FIG. 4, the motor 150a differs from the first embodiment in that an insulating structure 134 is further provided. The insulating structure 134 disposed at the periphery of the tubular portion 104 is located among the coil 114, the upper magnetic pole plate 110 and the lower magnetic pole plate 112. The insulating structure 134 can prevent the coil 114 from contacting the upper magnetic pole plate 110 and the lower magnetic pole plate 112. In this embodiment, the insulating structure 134 can be a circular or I-shaped structure.

In FIG. 5, the motor 150b differs from the first embodiment in that a fixed portion 142 is further provided. In this embodiment, the axial hole 140 is a through hole penetrating a seat 102a, and the fixed portion 142 is disposed on and seals the bottom of the tubular portion 104. The fixed portion 142 and the seat 102a can be made of same material or two different materials.

Note that the stator structure of the described fan or motor can be integrally formed as a single piece by permeable magnetic material to increase magnetic conduction efficiency, concentricity, perpendicularity and structural integrity.

Additionally, because the tubular portion and the seat are formed as a monolithic piece, no connection is needed therebetween. Thus, the volume of the fan and the motor in axial and radial directions can be reduced. Furthermore, the stator structure of the described fan or motor is made of permeable magnetic material, and can increase attraction between the rotor and stator and prevent the rotator from being thrown away while rotation.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A motor comprising:
   a stator base having a seat and a tubular portion which protrudes from the seat and has an axial hole, wherein the seat and the tubular portion are formed as a monolithic piece to be a magnetic conductor;
   a rotor enclosing the tubular portion and having a shaft disposed in the axial hole and a magnetic pole part; and
   a magnetic pole assembly telescoped onto the tubular portion;
   wherein an attraction is formed between the magnetic pole part and the seat.

2. The motor as claimed in claim 1 wherein the magnetic pole assembly comprises:
   at least one upper magnetic pole plate disposed near a top of the tubular portion;
   at least one lower magnetic pole plate disposed near a bottom of the tubular portion; and
   at least one coil disposed between the upper magnetic pole plate and the lower magnetic pole plate.

3. The motor as claimed in claim 2, wherein the coil is installed by axially winding, adhesion or socketing.

4. The motor as claimed in claim 2, further comprising a first insulating structure disposed among the coil, the upper magnetic pole plate and the lower magnetic pole plate, wherein the first insulating structure is circumferentially disposed at a periphery of the tubular portion.

5. The motor as claimed in claim 4, wherein the first insulating structure is a circular or an I-shaped structure.

6. The motor as claimed in claim 4, further comprising:
   a circuit board disposed on the seat; and
   a second insulating structure disposed between the circuit board and the lower magnetic pole plate.

7. The motor as claimed in claim 2, wherein the upper and lower magnetic pole plates have an insulating material coated on a surface thereof, respectively.

8. The motor as claimed in claim 1, further comprising a wear pad disposed between the shaft and the tubular portion.

9. A fan comprising:
a stator base having a seat and a tubular portion which protrudes from the seat and has an axial hole;
a rotor enclosing the tubular portion and having a shaft disposed in the axial hole and a magnetic pole part;
at least one blade circumferentially disposed at a periphery of the rotor; and
a magnetic pole assembly having an upper magnetic pole plate and a lower magnetic pole plate corresponding to the upper magnetic pole plate, and telescoped onto the tubular portion;
wherein an attraction is formed between the magnetic pole part and the seat.

10. The fan as claimed in claim 9, further comprising:
at least one coil disposed between the upper magnetic pole plate and the lower magnetic pole plate.

11. The fan as claimed in claim 10, wherein the coil is installed by axially winding, adhesion or socketing.

12. The fan as claimed in claim 10, further comprising a first insulating structure disposed among the coil, the upper magnetic pole plate and the lower magnetic pole plate, wherein the first insulating structure is circumferentially disposed at a periphery of the tubular portion.

13. The fan as claimed in claim 12, wherein the first insulating structure is a circular or an I-shaped structure.

14. The fan as claimed in claim 12, further comprising:
a circuit board disposed on the seat; and
a second insulating structure disposed between the circuit board and the lower magnetic pole plate.

15. The fan as claimed in claim 10, further comprising an insulating material coated on the upper magnetic pole plate or the lower magnetic pole plate.

16. The fan as claimed in claim 10, wherein the upper magnetic pole plate or the lower magnetic pole plate comprises a pole tooth portion and a socket hole.

17. The fan as claimed in claim 9, further comprising a wear pad disposed between the shaft and the tubular portion.

18. The fan as claimed in claim 9, further comprising a sidewall circumferentially disposed at a periphery of the stator base.

19. The fan as claimed in claim 9, further comprising a fixed portion disposed on a bottom of the tubular portion.

20. A motor comprising:
a stator having a base made of a magnetically conductive material, the base having a seat and a tubular portion directly protruding from the seat;
a rotor mounted on the seat of the base, having a magnetic pole part and coupled to the stator; and
a magnetic pole assembly having a an upper magnetic pole plate and a lower magnetic pole plate, and telescoped onto the tubular portion;
wherein an insulating structure is disposed between the circuit board and the lower magnetic pole plate, and an attraction is formed between the magnetic pole part and the seat.

* * * * *